April 6, 1965 R. W. FOWLER 3,176,469
ORIFICE-IN-SERIES CONTROL FOR AUTOMATIC FLOAT-OPERATED GATES
Filed April 21, 1960 3 Sheets-Sheet 2

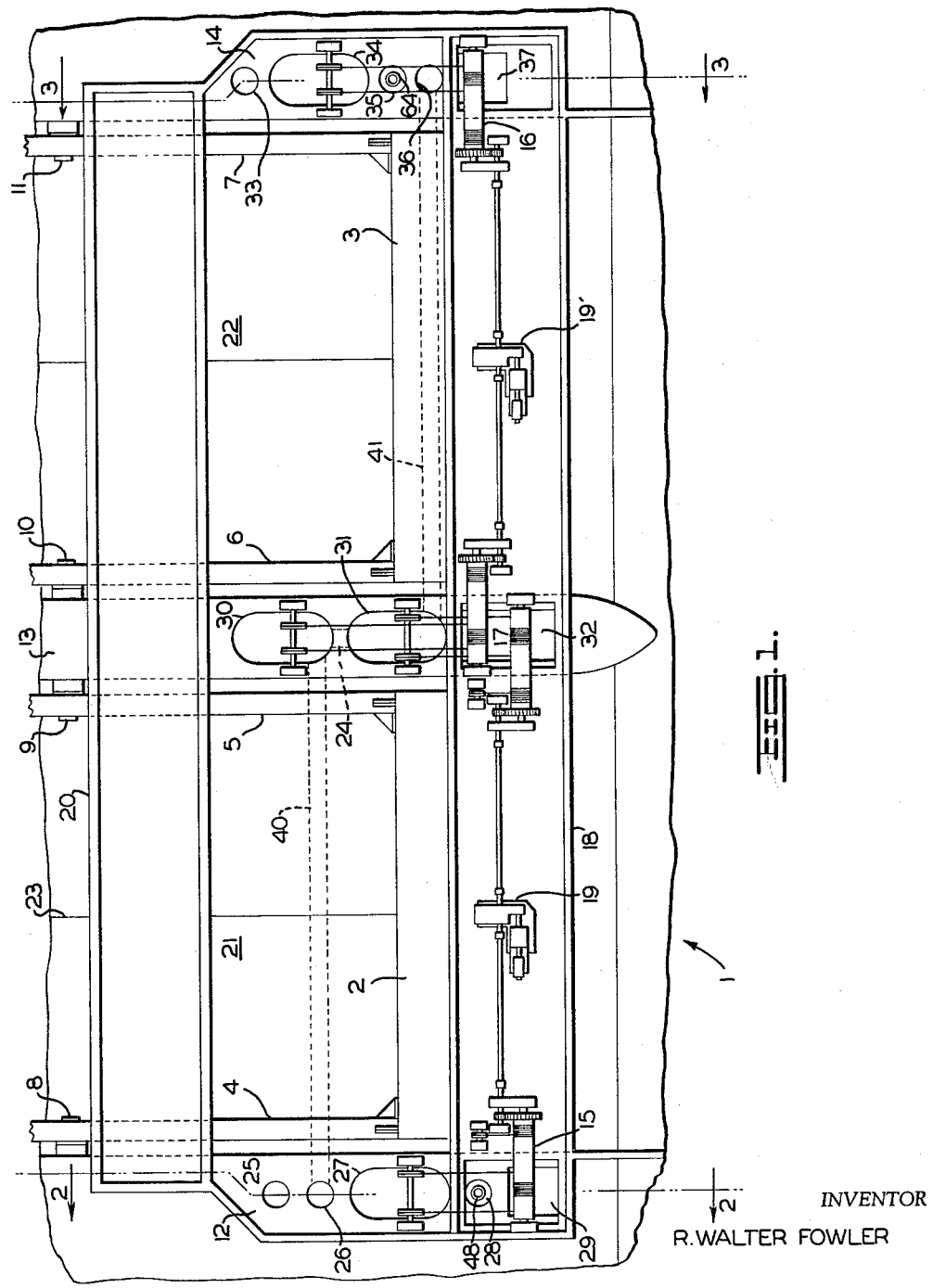

INVENTOR
R. WALTER FOWLER

BY Ernest L. Cohen
Gersten Sadowsky
ATTORNEY

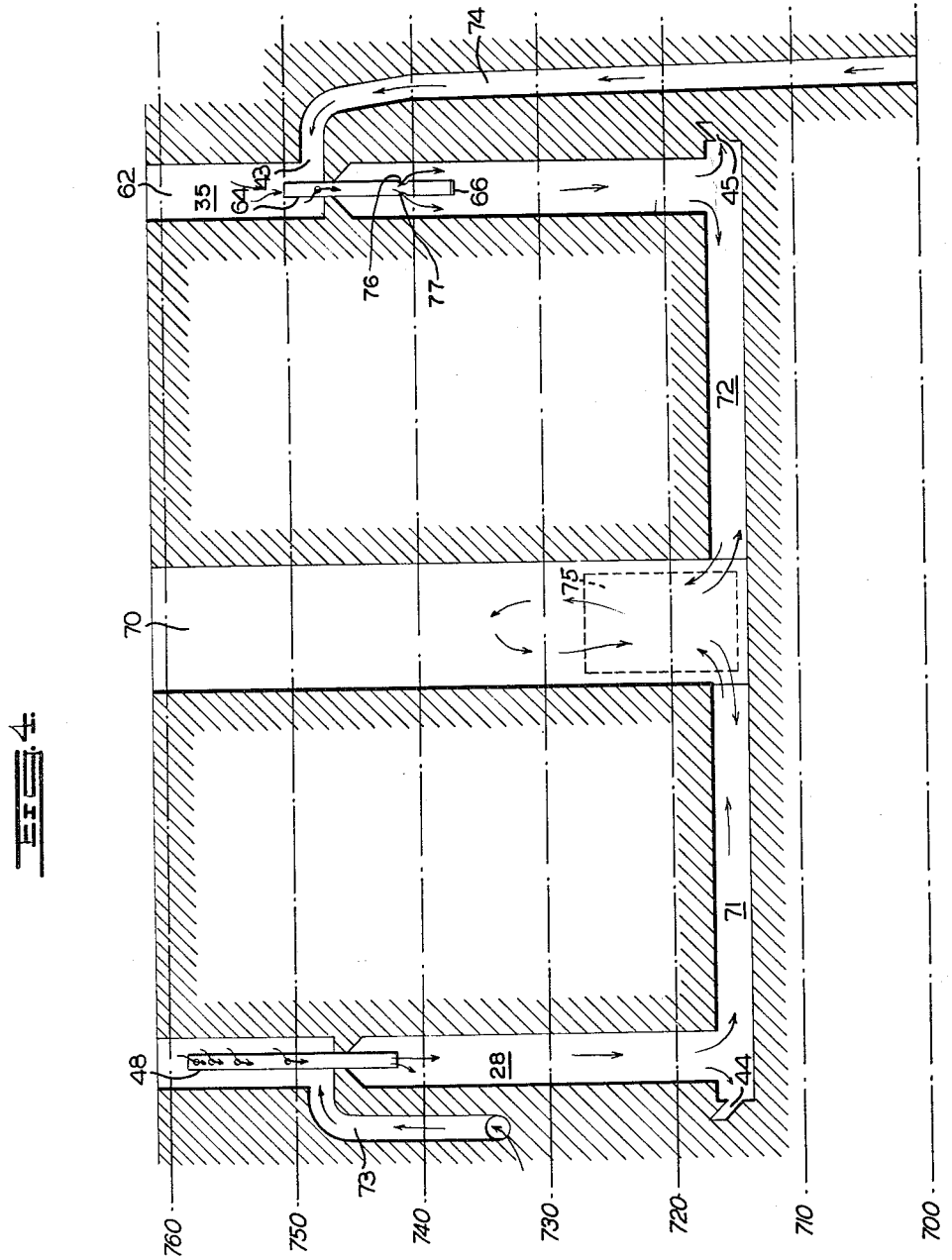

United States Patent Office 3,176,469
Patented Apr. 6, 1965

3,176,469
ORIFICE-IN-SERIES CONTROL FOR AUTOMATIC FLOAT-OPERATED GATES
Richard Walter Fowler, 1010 S. Franklin St., Denver 9, Colo.
Filed Apr. 21, 1960, Ser. No. 23,860
4 Claims. (Cl. 61—22)
(Granted under Title 35, U.S. Code (1952), sec. 266)

The invention here described and claimed may be manufactured and used by or for the Government of the United States of America for governmental purposes without the payment of royalties thereon or therefor.

This invention relates to a control for automatic float-operated gates for protection against overflow conditions in reservoirs as found in dams or canals. Gates of this type have been used for some years past and have proved advantageous in many respects. Since they require no power for operation, the gates remain effective during storms when the power supply may be discontinued, and when flood gates are most likely to be needed. Being automatically controlled, the gates will continue to provide protection during flood conditions, in the absence of operating personnel. Because of large volume of water which may be released through the comparatively narrow spillways with which these gates may be used, they offer a means for protection which is much less costly than other modes of automatic flood protection, such as ungated overflow-type spillways. However, an automatic float-operated gate requires a well regulated control to effectively operate under critical conditions, and have a reasonably long service life.

Control systems for float operated gates utilizing the overflow from weirs to obtain a regulated operation for the float, are known in the art. An example of a system of this nature may be found in Patent No. 1,363,820, issued to Sommer. A drawback of an arrangement such as shown in the patent is that the weir must be of considerable capacity to insure prompt gate action for control of flash floods. More recent designs wherein the weirs have been connected by small wire ropes in a servo linkage to the gate hoist to proportion gate opening to the depth of the flood pool, have also proved unsatisfactory under certain critical conditions of use. A construction of this type produces an inherently unstable control under which the gate may continually move up and down in a so-called "hunting" motion. The resulting variable spill is objectionable from the standpoint of water recording. Also erratic operations cause wear of gate and hoist parts, and stresses developed may cause breakage of one of the small cables which are part of the servo linkage for the moving weirs. This hazard could cause the gate to open wide, and release a flood.

The present invention provides a safe, dependable control for spillway gates which will automatically regulate the release of flood waters from reservoirs or canals according to a predetermined pattern in the event of flash floods. This control is available without the necessity of external power other than that derived from the impounded water.

The improved gate control eliminates erratic gate action and the hazard of sudden excessive flood releases.

An object of this invention is to achieve a rate of inflow of water to control a float, which can be made to increase gradually, and thus increasing the control range. An exemplary construction is characterized by an arrangement of stationary weirs in the form of one or more pipe-like elements, each having a plurality of uniquely located openings, and through which the waters from the main reservoir must pass to enter the float control chamber.

Another object of this invention is to improve a spillway and gate structure for a reservoir such as in a dam or canal by incorporating therewith, a novel float control apparatus to effectuate a smooth, dependable, automatic operation of the gate.

A still further object of this invention is to provide a dam with a flood gate control having weir means held stationary during operation, to remove the possibility of sending unprecedented floods down a river due to the sticking of a gate in open position such as may result from a breakage of a weir cable.

In order that the invention may be more clearly understood reference will now be made to the accompanying drawings which show by way of example a preferred embodiment thereof.

In the drawings:

FIG. 1 shows a plan view of the gate hoist assembly in place upon the abutments and pier forming the spillways.

FIG. 4 is a schematic showing of representative passages in the spillway structure with the novel weir devices in place, and the directions of flow in the controlling waters.

Figure 3:
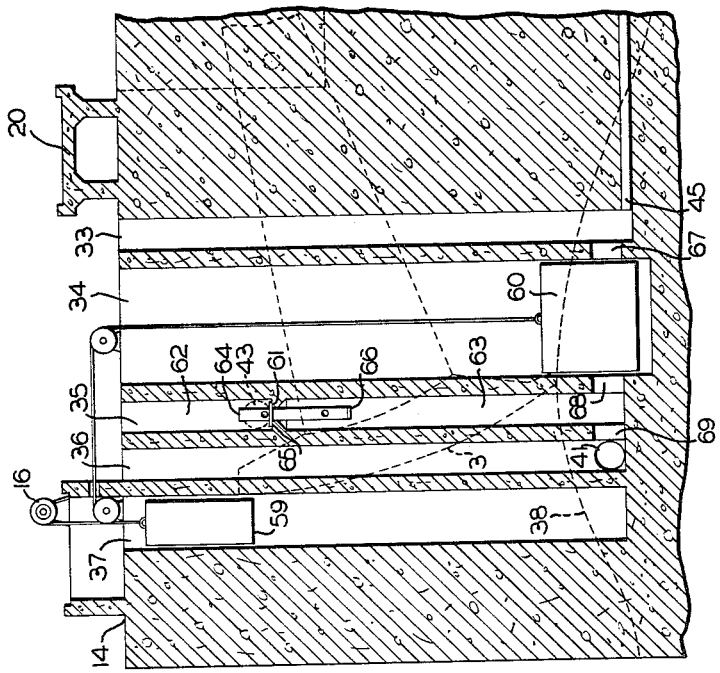
FIG. 3 shows a section through the right abutment as shown in FIG. 1.

The over-all gate structure 1 is shown in FIG. 1 as having a left gate 2, and a right gate 3, mounted by means of a bearing secured in each of the radial arms 4, 5, 6, and 7 thereof, for pivotal movement on trunnion pins 8, 9, 10, and 11 fixed in supporting abutments 12 and 14, and an intermediate pier 13. At the front or upstream ends of the left and right abutments 12, and 14, are located hoist drum apparatus 15 and 16, respectively, and similarly located on pier 13 is a double hoist apparatus 17. A hoist deck 18 spanning above the abutments and pier, provides a platform to suitably locate the hoist apparatus. Also located on the hoist deck between the drums, are powered drives, such as motor means 19 and 19'. In an emergency these drives are avilable to be clutched to drive shafts from the hoist apparatus, but are normally unclutched and ineffective to drive the hoists.

Abutments 12, 14, and pier 13, in an upright parallel relationship are joined by a spanning roadway bridge 20, all of a masonry construction, such as concrete. Two relatively narrow channels are formed by the walls of the upright structures and provide passages 21, 22 for the waters entering the spillway when the gates 2, 3 are drawn up to permit the waters to flow thereunder. A masonry construction also forms the bed of each passage. A contraction joint, such as indicated by 23, is provided in each bed.

Figure 2:
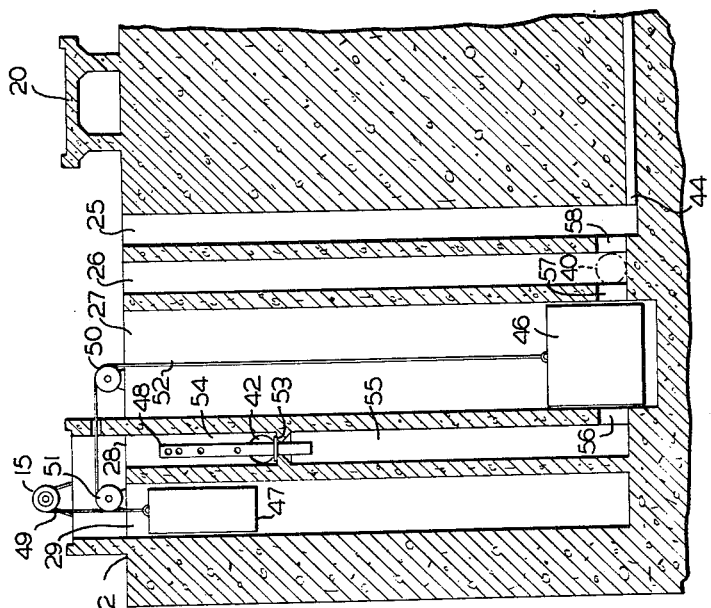
FIG. 2 shows a section through the left abutment as shown in FIG. 1.

Considering FIG. 1, in conjunction with FIGS. 2 and 3, a unique arrangement of interrelated apparatus housing and water passages will become apparent. Within each abutment and the pier, there are a plurality of compartments in the form of wells with full openings at the top sides of the respective masonry structures. As shown in FIG. 1, abutments 12 and 14 are constructed to include wells 25, 26, 27, 28, and 29, and 33, 34, 35, 36, and 37, respectively. Pier 13 is provided with wells 30 and 31 communicating at their bottom by a passage 24, and a further well 32. The masonry bed in passage 22, as shown by dash lines in FIG. 3, is formed with a hump 38, rising significantly above the level defined by the bottom of the wells. A seal means along the bottom edge of gate 3 is in contact with the top of hump 38 when the gate is down in closed position. Gate 2, when closed, also effects a water tight seal by reason of its bottom edge resting upon a similar masonry rise in the passage 21. Within the masonry rises in the respective passages are conduits 40 and 41, providing communication between the compartments in abutments 12, and 14 and those in the pier 13. Connecting the reservoir of the dam and the water receiving wells of the abutments are conduits shown in FIGS. 2, 3 as inlet openings 42, 43. Outlet passages for water accumulating in the wells are provided by drain pipes 44 and 45 in abutments 12 and 14, respectively.

The mechanism for providing a controlled raising and lowering of the gates 2 and 3 is housed in the various wells of the masonry structure. In abutment 12 are found a float 46, a counterweight 47, and a weir element 48. The weir comprises a pipe open at both ends and having a series of unevenly spaced orifices aligned parallel to its longitudinal axis.

Steel ropes connect gate 2 to hoist drum 15, and a similar rope 49 connects the counterweight 47 to the drum. Pulleys 50, 51 support steel rope 52, connecting the float 46 to the counterweight. The counterweight is operable to move up and down in its well 29.

Well 28 includes a partition 53, compartmenting the well into portions 54 and 55. The weir element 48 is supported in a central opening of the partition by means of a flange thereon, which effects a seal between the portions 54 and 55. In upper portion 54 are found the orifices in weir 48, and the inlet opening 42. Lower portion 55 into which the lower end of the wier opens, communicates with the float well 27 through passage 56.

Well 27 communicates with the connecting conduit 40 through passage 57 and the well 26. Passage 58, in conjunction with passages 56 and 57, provides the means interconnecting the wells 26 to 28, with the well 25 and the drain pipe 44 opening into the bottom thereof.

Abutment 14 includes a similar arrangement of operating control mechanism for the gate 3. Counterweight 59, movable in well 37, is connected to hoist drum 16, and float 60 operable in well 34 is connected to the counterweight by a steel rope supported on pulleys. Gate 3 is opened and closed by means of its rope connections to the drum 16, as the latter is made operably responsive to the weight forces produced by the counterweight and the float.

Well 35 of the abutment 14 is compartmented by a partition 61 into portions 62 and 63. A second pipe shaped weir element 64 is supported in a central opening of partition 61 by means of a flange 65 thereon, which effects a seal between the portions 62 and 63. Weir element 64 is open at its top, but closed at its bottom by a plate 66. An orifice in the weir immediately above flange 65 opens into portion 62. Between flange 65 and plate 66 are two orifices in series 76 and 77, shown in FIG. 4 (one is shown in FIG. 3) arranged at the same level on opposite sides of the weir pipe, and which open into portion 63. Portion 62 consequently includes openings from inlet 43, and from the weir 64 at its top and at its upper orifice. The well 35 communicates with wells 33, 34, 36, conduit 41 and drain 45, by means of passages 67 to 69.

In pier 13, communicating wells 30 and 31 each house a float (not shown); and well 32 houses two counterweights (not shown). Hoist mechanism 17 interconnects the gates 2 and 3 to the weights and floats in substantially the same manner as that described in respect to hoist drums 15 and 16 on abutments 12 and 14, respectively. A path for the water to enter or leave float wells 30, 31 is facilitated by the conduits 40, 41 connecting the pier wells to abutment wells 26 and 36, respectively.

Operation of the gate control mechanism of this invention is dependent upon the interacting forces produced by the effective weights of the gates, the counterweights, and the floats. Considering the cooperation in either of the abutments, it can be seen that a gate is closed when the effect of the force due to the weight thereof, acting down on a rope on one side of the hoist drum, is greater than the force due to the effective weight of the counterweight, similarly acting on a rope on the other side of the hoist drum. The effective weight of a counterweight is determined by the action of the float connected thereto over pulleys. In the absence of any buoying up effect, the weight of the float attempts to counterbalance the counterweight, and to thereby diminish the effecitve weight of the counterweights. As the water level rises in a float well, a buoying up force on the float reduces the weight thereof which is available to diminish the effective weight of the counterweight. When this effective weight and its force on the hoist rope is greater than that force engendered by the weight of the gate on the ropes attached thereto, the counterweight moves down in its well, and the gate starts to open by pivoting on its trunnion pins. A lowering of the water level in the float well will produce an opposite effect, whereby the weight of the gate overcomes the counterbalancing effective weight, and the gate will start to return to closed position. A raised level in the float well maintained by a continuing inflow of water equal to the outflow in the drain pipe, will cause the gate to be held stationary in the position to which it has been raised or lowered.

An appropriate regulation of the water level in the float wells such as that achieved by the invention, will produce a smooth and dependable gate control operation.

In FIG. 4, there is shown in schematic representation abutment wells housing the left and right weir elements 48 and 64, and an outlined area 70 designating all the float wells (27, 30, 31, and 34), and 75 designating the floats therein. Also shown are header passages 71, 72 representing the paths of water flow between the weir element wells (28 and 35) and the float wells, and inlet passages 73, 74, representing the water flow paths from the reservoir to the inlets 42 and 43 in the upper portions of the weir element wells 28 and 35.

To present an illustrative operation of the invention it will be assumed that the various parts of the structure shown in FIG. 4 are situated at the elevation levels corresponding to the scale at the left of the figure.

A rising reservoir will cause the following action of the control. Passage 74 having an opening in the reservoir at elevation 700.0 permits water to be supplied to portion 62 through inlet 43 when the reservoir level rises to elevation 747.0. Water will cover the weir 64 at elevation 750.0 and flow through the upper orifice and open top of the weir and out through the two lower orifices in series 76 and 77, at elevation 740.75. Headers 71 and 72 receiving the water will soon lose their contents through the drain pipes 44 and 45. As the reservoir continues to rise and overflow of the weir 64 increases, the water level will rise inside the pipe of the weir 64 closed off by plate 66, and in the float wells 70, since the relatively small drains 44 and 45 can no longer prevent headers 71 and 72 from filling and overflowing. When the reservoir reaches elevation 750.23, the flow through weir 64 will be sufficient to maintain a level of 724.5 in the float wells. Consequently, the float submergence will be so increased as to diminish its counterbalancing weight effect sufficiently to permit the counterweights to cause the gates to begin opening. As the gate rises the submergence of float 75 will gradually decrease as the required hoisting effort decreases due to (1) movement of the center of gravity of the gate toward its hinge; (2) decrease in hydraulic forces; and (3) decrease in seal friction.

If no inlet orifices were provided other than the two lower ones in the weir 64, the floats would continue to rise at about the same rate as the reservoir. However in weir 48, the orifice centered at elevation 750.5, begins to contribute at reservoir level 750.4, and accelerates the float rise to three times reservoir rise. Nevertheless the gate rises slowly at this point, or about two and half times the reservoir rise. Slow and steady gate rise is considered desirable at this flood level since most of the gate operations will be in this part of the reservoir capacity.

Further rise in the reservoir level causes the weir 48 to be additionally effective through its orifice at level 752.5 to further increase the rate of flow into the float wells. As a result gate opening accelerates to five times that of the reservoir rise.

When the reservoir rises to elevation 754.75, the water level in the float wells will be at 740.75, submerging the lower orifices in series 76 and 77 in weir 64. Inflow through these orifices thereafter diminishes as the reservoir rises. However, the lagging inflow is picked up as the level rises to cause weir 48 orifices at levels 754.5 and subsequently at level 758.0, to become effective.

The crest of weir 48 is at elevation 758.5. When the rising reservoir reaches this elevation the gates will have opened within one to two feet of their maximum. If the reservoir still continues to rise, the gates will open to their maximum while the level increases from 758.5 to 758.6. Due to friction in moving parts about a one-tenth of a foot decline from this maximum reservoir level is required before the gates begin to close. From lesser peaks of reservoir rise, greater initial declines in levels would be necessary to begin closing.

The two gate arrangement disclosed may be extended to protect reservoirs of larger capacity by merely providing additional spillway passages and gates. Such passages would be defined by the walls of additional piers constructed in the form of pier 13. In the manner taught by the present disclosure the additional piers would have wells to house a number of floats and a counterweight, and would communicate with the other pier and abutment structures through water passages such as part 24, and conduits 40, 41. The gates would be connected to the counterweight float control by means of a hoist mechanism and pulley system in the manner such as previously described.

While I have shown and described a specific apparatus for use in practicing my invention, other modifications will be readily apparent to those skilled in the art.

I claim:

1. In an apparatus to control the operative position of a radial type flood gate means in a spillway from a reservoir, said gate means including a gate being held by its own weight in closed position to restrain the flow of water from the reservoir into the spillway, a control apparatus operative to position the gate including counterweight elements attached to the gate over a pulley suspension whereby the weight of the elements effect a force tending to open the gate, float elements attached to the counterweight elements over a pulley suspension, the effective weight of the float elements being operable to counterbalance the weight of the counterweight elements and diminish the effect of said force, whereby the gate is not moved, compartmented structures aligned in parallel and having means to support the gate for pivotal movement, two of the structures having at least three compartments, in each of said two compartmented structures a first compartment housing one of the counterweight elements suspended therein, a second compartment housing one of the float elements suspended therein, and a third compartment having partition means forming an upper and a lower portion which through a passage opening at its bottom communicates with the second compartment, a hollow weir element supported through the partition means and having openings into both portions of the third compartment wherein said openings communicate with each other through a hollow part of said weir element, an inlet pipe having an opening at the bottom of said upper portion and connecting said reservoir with said upper portion, an outlet pipe having an opening which is small relative to said inlet pipe opening, being connected to the bottom of the second compartment to provide a drain therefor, the control apparatus being operative to gradually open the gate when at a predetermined level in a flood in the reservoir water enters into each of the two compartmented structures and passes therethrough in the inlet pipe, the weir element and its openings, the said passage, and into the second compartment to buoy up the said one float element, and diminish the counterbalancing effect thereof upon the said one counterweight element, whereby the weight of the latter is effective to open the gate by overcoming the weight of the gate and the friction restraining the movement thereof.

2. In an apparatus controlling the position of a flood gate restraining the flow of water into a spillway, the improvement comprising a float means, and a float control mechanism housed in compartmented structures including first and second compartmented structures, each compartmented structure including a first compartment having an input passage and a drain and in which the float means is positioned in accordance with a varying rate of flow thereto, a second compartment having an inlet receiving said restrained water at a varying rate of flow, and a third compartment communicating with the first through said passage, the second and third compartments communicating through a weir element having formed as a part thereof a means providing a passage for the flow of water from of the said inlet, and arranged on said weir to be effective to modify the rate of flow into the first compartment as the rate of flow through the inlet changes, said first compartmented structure having the weir element thereof comprising a straight hollow pipe extending up into the second compartment and presenting an open end thereto constituting a primary regulator of said rate of flow of water into the first compartment, and orifice means in the wall of the hollow pipe opening into the third compartment, constituting a secondary regulator of said rate of flow of water into the first compartment of said first compartmented structure, and said second compartmented structure having the weir element thereof comprising a straight hollow pipe extending up into the second compartment and down into the third compartment and presenting open ends thereto, and a plurality of unevenly spaced orifices in the wall of the hollow pipe extending up into the second compartment, constituting a graduated further regulator of the rate of flow of water into the first compartment of said second compartmented structure.

3. In an apparatus for automatically setting the controlling position of a radial type flood gate means operatively arranged in a compartmented structure defining a spillway from a water reservoir, the gate means including a gate being held by its own weight in closed position to restrain an outflow of reservoir water through said spillway, a gate position control mechanism arranged within said compartmented structure and operatively connected to said gate for positioning the gate between closed and open positions, said mechanism comprising a float, a gate displacing means, and connections therebetween made operative to activate said gate displacing means by movement of said float vertically to traverse a well formed within and constituted by a first compartment of the compartmented strucure, a passageway constituted by second and third compartments in said compartmented structure opening into said well and accommodating a flow of water from said reservoir to said well for causing said float to move and seek a vertical position commensurate with the water level attained in said well, and a water flow control device in said passageway having a weir arrangement comprising a straight hollow pipe extending up into said second compartment and down into said third compartment and presenting open ends thereto, said pipe having formed therein a plurality of vertically spaced discrete openings constituted by a plurality of unevenly spaced orifices in the wall of the pipe extending up into said second compartment whereby said open ends and orifices of said hollow pipe provide a conduit between said second and third compartments allowing water from said reservoir to charge said well of the first compartment by way of said weir arrangement in a regulated manner, wherein said water flow control device is operative to determine the manner in which the water level changes in said well, whereby said float effectively regulates the operation of said position control mechanism to determine the position of said gate.

4. In an apparatus for automatically setting the controlling position of a radial type flood gate means operatively arranged in a compartmented structure defining a spillway from a water reservoir, said compartmented structure comprising first, second and third compartments, said gate means including a gate being held by its own weight in closed position to restrain an outflow of reservoir water through said spillway, a gate position control mechanism arranged within said compartmented structure and operatively connected to said gate for positioning the gate between closed and open positions, said mechanism comprising a float, a gate displacing means and connections therebetween made operative to activate said gate displacing means by movement of said float vertically to traverse said first compartment constituting a well, said second and third compartments constituting a passageway opening into said well and accommodating a flow of water from said reservoir to said well for causing said float to move and seek a vertical position commensurate with the water level attained in said well, and a water flow control device fixed in said passageway comprising a weir arrangement connecting said second and third compartments which have openings through which water from said reservoir flowing by way of said weir arrangement charges said well, said weir arrangement including a straight hollow pipe having formed as a part thereof a plurality of vertically spaced discrete openings through which said reservoir water is received flowing at a regulated rate and wherefrom said water flows at said regulated rate through said passageway and into said well, one portion of said pipe extending up into said second compartment and presenting an open end thereto constituting a primary regulator of said rate of flow of water into said well, and another portion of said pipe extending down into said third compartment, presenting thereto a closed end and respective orifice means of a further plurality of discrete openings in the wall of said pipe to constitute a secondary regulator of said rate of flow of water into said well whereby said water flow control device is operative to determine the manner in which the water level changes in said well to regulate the operation of said position control mechanism determining the position of said gate.

References Cited by the Examiner
UNITED STATES PATENTS

| 275,371 | 4/83 | Emerson | 61—22 |
| 981,171 | 1/11 | Collar | 61—23 |
| 1,130,097 | 3/15 | Meikle | 61—23 |
| 1,363,820 | 12/20 | Sommer | 61—23 |
| 1,973,321 | 9/34 | Schultz | 210—163 |
| 2,284,416 | 5/42 | Gordon | 210—166 |
| 2,667,748 | 2/54 | Heath | 61—25 |

FOREIGN PATENTS

| 15,297 | 1911 | Great Britain. |
| 574,037 | 12/45 | Great Britain. |
| 55,005 | 1/91 | Germany. |
| 9,162 | 10/56 | Germany. |
| 179,747 | 2/54 | Austria. |

EARL J. WITMER, *Primary Examiner.*

WILLIAM I. MUSHAKE, JACOB L. NACKENOFF,
*Examiners.*